United States Patent [19]

Matsushima et al.

[11] 4,261,450

[45] Apr. 14, 1981

[54] FAILURE DETECTING APPARATUS FOR A DUAL VALVE

[75] Inventors: Shujiro Matsushima, Kanazawa; Akio Yoshioka; Akihiko Nakano, both of Komatsu, all of Japan

[73] Assignee: Kabushiki Kaisha Komatsu Seisakusho, Tokyo, Japan

[21] Appl. No.: 959,464

[22] Filed: Nov. 13, 1978

[30] Foreign Application Priority Data

Nov. 10, 1977 [JP] Japan .................. 52/149975[U]

[51] Int. Cl.³ .................. F16D 67/06; B60K 41/24
[52] U.S. Cl. .................. 192/12 C; 192/129B
[58] Field of Search .................. 192/12 C, 129 B

[56] References Cited

U.S. PATENT DOCUMENTS

| 2,722,298 | 11/1955 | Munschauer | 192/12 C |
| 3,865,218 | 2/1975 | Jones, Jr. | 192/12 C |
| 4,072,222 | 2/1978 | Coon et al. | 192/12 C |
| 4,138,005 | 2/1979 | Schneider et al. | 192/12 C |

Primary Examiner—C. J. Husar
Assistant Examiner—Conrad Berman
Attorney, Agent, or Firm—Armstrong, Nikaido, Marmelstein & Kubovcik

[57] ABSTRACT

A failure detecting apparatus for a dual valve provided in a pneumatic circuit for a slide of a press machine, which comprises an air tank containing compressed air therein, a clutch and brake mechanism for the slide selectively connectible with the air tank, a pair of solenoid valves connected in parallel with the air tank and the clutch and brake mechanism, each of the solenoid valves having two positions wherein the clutch and brake mechanism is connected to atmosphere when the solenoid valve is at first position and is connected to the air tank when the solenoid valve is at second position, and a pressure operated switch interposed between the solenoid valves and the clutch and brake mechanism wherein the pressure operated switch is adapted to be turned on and off for each cycle of the slide when both solenoid valves are in good working order.

3 Claims, 4 Drawing Figures

FAILURE DETECTING APPARATUS FOR A DUAL VALVE

BACKGROUND OF THE INVENTION

This invention relates to a failure detecting apparatus for a dual valve provided in a pneumatic circuit for supplying a pneumatic pressure to a clutch and brake adapted to actuate and control movable parts of machine tools or the like.

Movable parts of conventional machine tools etc, in particular, slide driving mechanisms of press machines are provided with a clutch and brake to which supply of compressed air is made or interrupted thereby to drive or stop the slide.

Further, solenoid valves are provided in the circuit for supplying pneumatic pressure to the clutch and brake.

Therefore, if the solenoid valve goes wrong, the slide cannot be stopped at its top dead centre and will move downwards so that it will strike twice and so the operation itself is very dangerous.

As a countermeasure for this, a dual valve comprising a pair of solenoid valves integrally arranged in parallel is provided in a pneumatic pressure supply circuit so that even if either one of the solenoid valves goes wrong, another solenoid valve is actuated so as to prevent the occurrence of two times of striking of the slide.

However, since it is dangerous to continue the operation as one of the solenoid valves remains in trouble, detection of the failure of one of the solenoid valves is required.

For this purpose, there has heretofore been employed a failure detecting apparatus adapted to detect the failure of one of the solenoid valves by detecting differential pressure; however, such construction is disadvantageous in that if the failure detecting apparatus of differential pressure detection type goes wrong, failure of the solenoid valve cannot be detected so that provision of a separate test circuit is required, and at the time of start and periodically the failure detecting apparatus of differential pressure detection type needs to be inspected and so it is complicated in construction and requires troublesome operation with low reliability in failure detection.

SUMMARY OF THE INVENTION

It is therefore an object of the present invention to provide a failure detecting apparatus for dual valves provided in a pneumatic circuit which is capable of detecting failure in one of the dual valves effectively.

Another object of the present invention is to provide a failure detecting apparatus for dual valves provided in a pneumatic circuit wherein reliability of failure detection can be improved significantly.

In accordance with an aspect of the present invention, there is provided a failure detecting apparatus for dual valves provided in a pneumatic circuit comprising an air tank having compressed air contained therein; a pneumatically operated means selectively connectible with said air tank; a pair of solenoid valve means connected in parallel with said air tank means and said pneumatically operated means, each of said solenoid valve means having two positions wherein said pneumatically operated means is opened to atmosphere when said solenoid valve means is at first position and is connected to said air tank when said solenoid valve means is at second position; and pressure operated switch means interposed between said solenoid valve means and said pneumatically operated means, said switch means being adapted to be turned on when the pressure applied thereon is in the region between first and second preset pressures wherein said first preset pressure is lower than a value which is high enough to actuate said pneumatically operated means and said second preset pressure is lower than a residual pressure within said pneumatically operated means in the case one of said solenoid valves is out of order, and turned off when the pressure applied thereon is lower than said second preset pressure.

The above and other objects, features, and advantages of the present invention will be readily apparent from the following description taken in conjunction with the accompanying drawings.

DETAILED DESCRIPTION OF THE INVENTION

Figure 1:
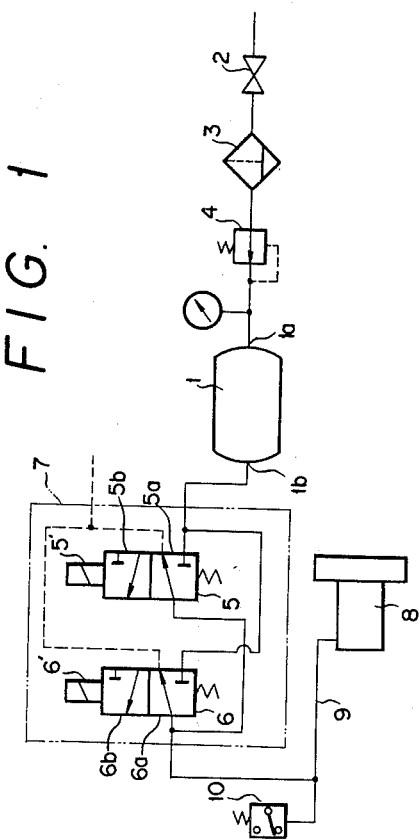
FIG. 1 is a schematic illustration of a failure detecting apparatus for dual valves according to the present invention.

The present invention will now be described below by way of an embodiment with reference to the accompanying drawings.

Reference numeral 1 denotes an air tank, 1a an inlet port which is connected through a gate valve 2, a filter 3 and a regulator 4 to a pneumatic pressure supply source (not shown), and 1b an outlet port which is connected through a dual valve 7 comprising first and second solenoid valves 5 and 6 to a clutch and brake 8.

The first and second solenoid valves 5 and 6 are adapted to be normally held at first positions 5a and 6a, respectively, where the pneumatic pressure chamber of the clutch and brake 8 is opened to atmosphere and is disconnected from the air tank 1. When solenoids 5' and 6' are energized, the solenoid valves 5 and 6 occupy their second positions 5b and 6b, respectively, where the air tank 1 is connected with the pneumatic pressure chamber of the clutch and brake 8.

The operation of the apparatus of this invention will be described hereinbelow.

Figure 2:
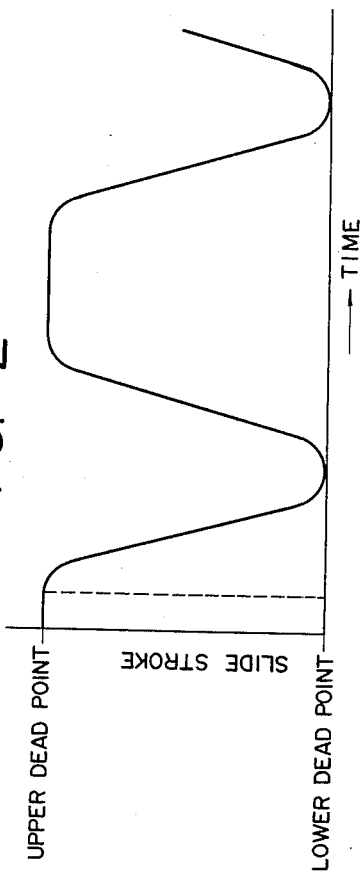
FIG. 2 is a graph showing a relationship between the slide stroke and time.

Under the condition shown, the solenoids 5' and 6' are deenergized and the first and second solenoid valves 5 and 6 occupy their first positions 5a and 6a where the pressure chamber of the clutch and brake 8 is opened to atmosphere so that the clutch is disengaged and the brake is put under braking condition with the slide being stopped at top dead centre as shown in FIG. 2. At that time, the pneumatic pressure P within the pressure chamber is zero as shown in FIG. 3.

Figure 3:
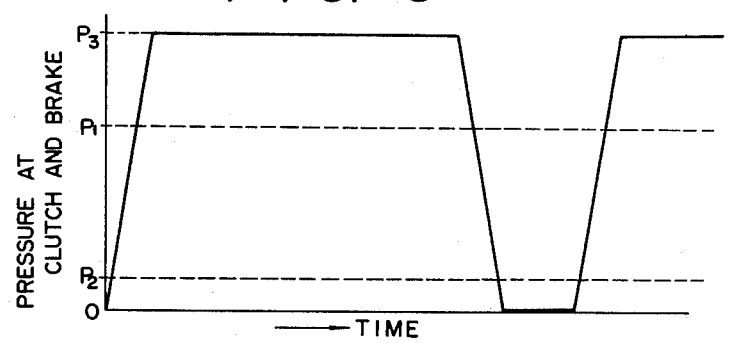
FIG. 3 is a graph showing a relationship between the pressure within the pressure chamber of the clutch and brake mechanism for the slide and time wherein both of the solenoid valves are in good working order.

When the solenoids 5' and 6' are energized to allow the solenoid valves 5 and 6 to occupy their second positions 5b and 6b, respectively, the compressed air within the air tank 1 will flow into the pressure chamber of the clutch and brake 8 so as to increase gradually the pneumatic pressure P as shown in FIG. 3. When the pneumatic pressure has reached a predetermined pressure $P_3$ (clutch and brake actuating pressure), the clutch is engaged or turned on, whilst the brake is put under non-braking condition with the slide being moved downwards. After having reached the bottom dead centre, the slide will move upwards again and then along the path shown in the stroke diagram shown in FIG. 2.

When the solenoid 5' and 6' are deenergized again, as mentioned above, the clutch is disengaged and the brake occupies its braking position with the slide being stopped at the top dead centre.

Next, the case where the second solenoid valve 6 is in trouble will be mentioned below.

Figure 4:
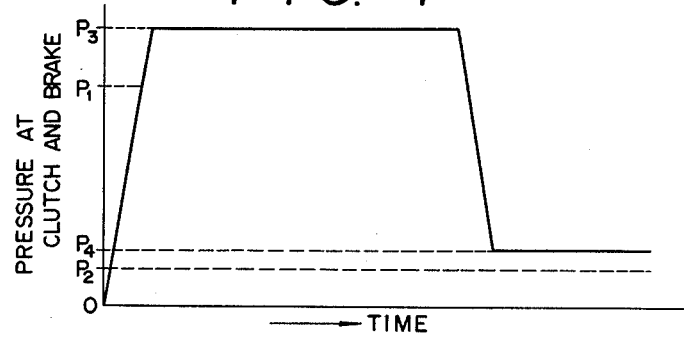
FIG. 4 is similar to FIG. 3 but showing one of the solenoid valves being out of order.

Under the above-mentioned condition, if the solenoid 5' of the first solenoid valve 5 is energized to allow the valve thereof to assume its second position 5b, the compressed air within the air tank 1 is supplied into the pressure chamber of the clutch and brake 8 and, at the same time, it is released to atmosphere through the second solenoid valve 6 occupying its first position 6a. Therefore, the pneumatic pressure within the pressure chamber is not raised to the predetermined pressure $P_3$ and reaches $P_4$ which is more or less higher than zero (refer to FIG. 4). Therefore, the clutch becomes disengaged and the brake is maintained in braking condition, with the slide being stopped at the top dead centre.

Further, if and when the first solenoid valve 5 is moved to its first position 5a, as similar manner as mentioned above, the compressed air within the pneumatic pressure chamber of the clutch and brake 8 is released to atmosphere so that the clutch is disengaged and the brake will be rendered operative. Still further, in case the second solenoid valve goes wrong at its second position 6b and the first solenoid valve 5 is held at the first position 5a by the energization of the solenoid 5', the compressed air is supplied into the pneumatic pressure chamber of the clutch and brake 8 so that the slide is moved downwards. The slide, after having reached its bottom dead centre, will be moved upwards. Then, near the top dead centre, the solenoid 5' is deenergized and the slide is stopped at the top dead centre. At that time, because the second solenoid valve 6 is in trouble at its second position 6b, the compressed air within the air tank 1 is still supplied into the pneumatic pressure chamber of the clutch and brake 8 and is released to atmosphere through the first solenoid valve 5 held at its first position 5a so that the pressure within the pneumatic pressure chamber is kept at $P_4$ which is somewhat higher than zero, as mentioned previously.

Further, the case where the first solenoid valve 5 is in trouble at its first position 5a or second position 5b, the same condition as the aforementioned case is obtained, and so its detailed description is omitted herein.

Stated in brief, when one of the solenoid valves 5 and 6 of the dual valve 7 goes wrong, the pneumatic pressure within the pressure chamber of the clutch and brake 8 cannot be decreased below $P_4$ (residual pressure) which is slightly higher than zero.

According to the present invention, aiming at the above-mentioned point, a pressure switch 10 is provided in a conduit pipe 9 connecting the dual valve 7 and the clutch and brake 8, said pressure switch 10 being set so as to be turned on when the pressure applied thereon is lower than the predetermined pressure $P_3$ (clutch brake actuating pressure) and is higher than $P_1$ which is higher than $P_4$ and turned off when such pressure is lower than $P_2$ which is lower than $P_4$.

By so doing, when the dual valve 7 is in normal condition, and is turned off by the stop of the slide at the top dead centre thereof. But, when either one of solenoid valves 5 and 6 of the dual valve 7 goes wrong, the pressure switch 10 cannot be turned off.

Therefore, in the case even if the slide has reached its top dead centre the pressure switch 10 (adapted to detect the slide reaching the top dead centre by means of a rotary cam limit swtich etc.) is not turned off, the failure of the dual valve can be detected and displayed by indicating it on a control panel, and so the failure can be detected readily.

Further, an electrical interlock can be provided so as to prevent restart of the press at the same time so that the restart of the slide can be prevented after it has stopped at the top dead centre thereof.

Further, the pressure switch 10 is repeatedly turned on and off every one cycle of the slide (press) so that failure of the pressure switch per se can be checked by itself without having to provide a separate test circuit etc., and therefore the apparatus is simple in structure and can be operated in a simple manner.

Since the present invention is constructed as mentioned hereinabove, failure of one of the solenoid valves 5 and 6 of the dual valve 7 can be detected by its simple arrangement and operation so that the reliability of detection of failure can be remarkably improved.

While the invention has been described and shown with particular reference to the preferred embodiment, it will be apparent that variations might be possible that would fall within the scope of the present invention, which is not intended to be limited except as defined in the following claims.

What we claim is:

1. A failure detecting apparatus for a dual valve provided in a pneumatic circuit comprising an air tank containing compressed air therein;
   a pneumatically operated means selectively connectible with said air tank;
   a pair of solenoid valve means connected in parallel with said air tank means and said pneumatically operated means, each of said solenoid valve means having two positions wherein said pneumatically operated means is connected to atmoshpere when said solenoid valve means is at first position and is connected to said air tank when said solenoid valve means is at second position; and
   pressure operated switch means interposed between said solenoid valve means and said pneumatically operated means, said switch means being adapted to be turned on when the pressure applied thereon is in the region between first and second preset pressures, said first preset pressure being lower than a pressure which is high enough to actuate said pneumatically operated means and said second preset pressure being lower than a residual pressure within said pneumatically operated means in the case one of said solenoid valve means is out of order, and turned off when the pressure applied thereon is lower than said second preset pressure.

2. A failure detecting apparatus as defined in claim 1 wherein said pneumatically operated means is a clutch and brake for use in a slide driving mechanism of a press machine.

3. A failure detecting apparatus as defined in claim 2 wherein said pressure operated switch is turned on and off for each cycle of the slide when both the solenoid valve means are in order.

* * * * *